(No Model.)

C. C. KAUFFMAN.
RAMIE, JUTE, &c., STRIPPING MACHINE.

No. 362,385. Patented May 3, 1887.

WITNESSES:
C. Neveux
C. Sedgwick

INVENTOR:
C. C. Kauffman
BY Munn & Co
ATTORNEYS.

United States Patent Office.

CHRISTIAN C. KAUFFMAN, OF NEW ORLEANS, LOUISIANA.

RAMIE, JUTE, &c., STRIPPING MACHINE.

SPECIFICATION forming part of Letters Patent No. 362,385, dated May 3, 1887.

Application filed June 1, 1886. Serial No. 203,846. (No model.)

*To all whom it may concern:*

Be it known that I, CHRISTIAN C. KAUFFMAN, of New Orleans, in the parish of Orleans and State of Louisiana, have invented a new and Improved Ramie, Jute, &c., Stripping Machine, of which the following is a full, clear, and exact description.

This invention has for its object the production of a machine for decorticating ramie, jute, and other fibrous plants; and it consists in certain novel constructions and combinations of mechanism and devices, substantially as hereinafter described, and pointed out in the claims, whereby the desired result is obtained in a very effective and perfect manner.

Reference is to be had to the accompanying drawings, forming a part of this specification, in which similar letters of reference indicate corresponding parts in both the figures.

Figure 1:
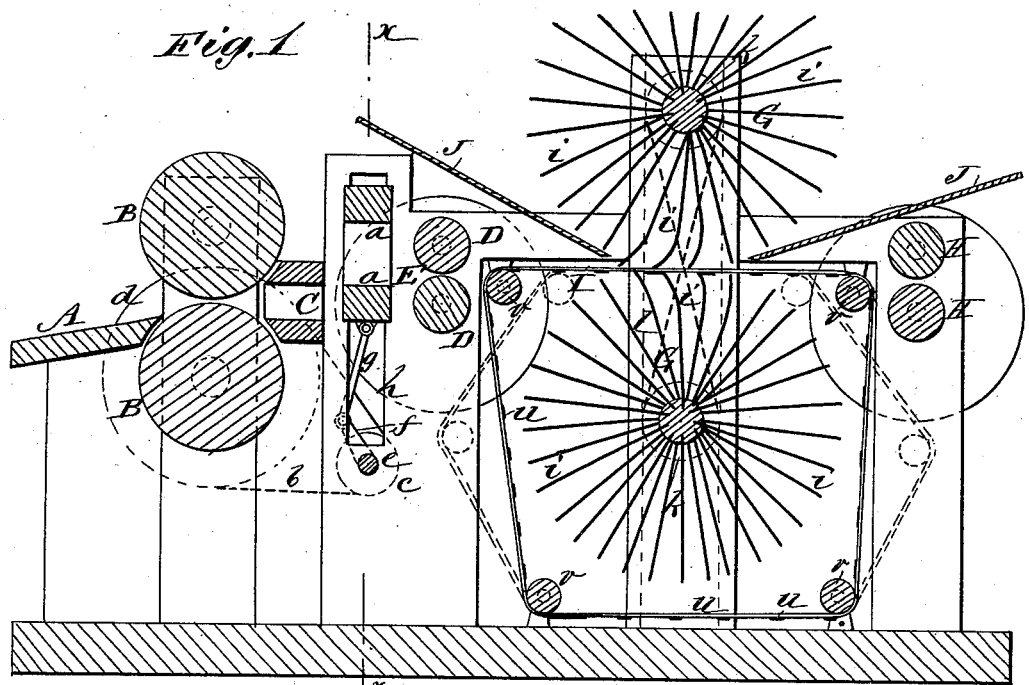
Figure 2:
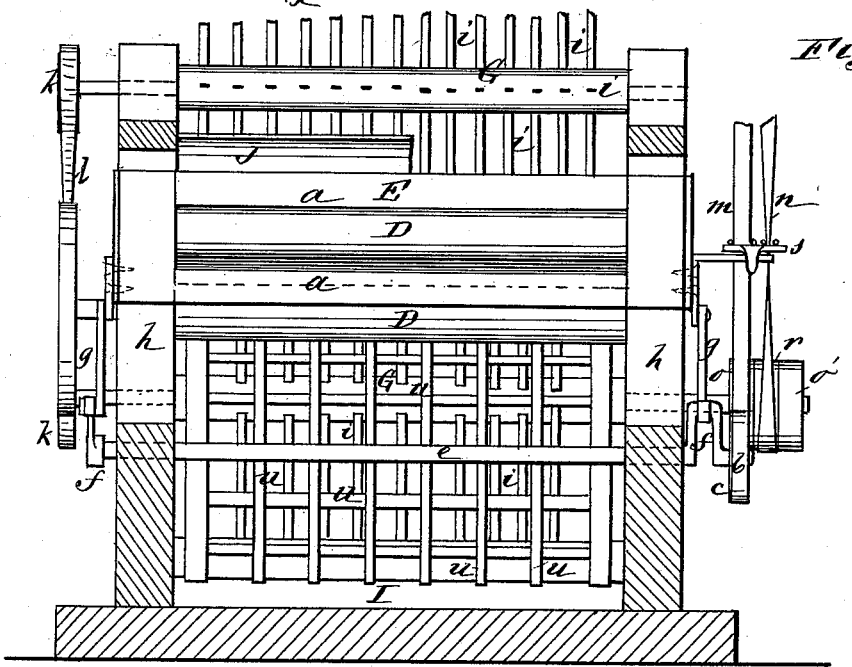

Figure 1 represents a centrally-vertical longitudinal section of a machine embodying my invention, and Fig. 2 a partly-broken transverse vertical section of the same upon the line $x\ x$ in Fig. 1.

The frame of the machine and the mechanism used for driving or operating its working parts may be variously constructed.

A is a feed-table, on or over which the jute, &c., stalks are passed to and through a pair of feed-rolls, B B, to which, or the one of which, rotary motion is communicated in any suitable manner. Passing from these feed-rolls, the stalks enter and are delivered through a stationary slotted frame or box, C, in rear of said rolls, and extending the length of the rolls, or thereabout, transversely of the machine. As the stalks come out of the box C on their way to a second pair of rolls, D D, either or both of which may be driven, they are caught by a vertically-reciprocating slotted breaker, E, interposed between the box C and rolls D D, said stalks as they pass through the breaker being struck successively on their upper and under sides, and, as the stalks are thus brought successively into contact with the upper and lower working-surfaces $a\ a$ of the breaker, they are broken transversely at short distances apart. To do this the double-acting breaker E should move up and down very rapidly. Said breaker may be driven by a belt, $b$, and pulley $c$ from a pulley, $d$, upon the shaft of one of the feed-rolls B, the shaft $e$ of the pulley $c$, which extends across the machine, having cranks $f$ on its opposite ends, which cranks are connected by rods $g$ with the ends of the breaker, that are fitted to slide up and down within slots $h$ in opposite sides of the main frame.

From the breaker the material to be stripped passes to and between a pair of revolving whippers, G G, which are composed, for the most part, of thrashing-fingers $i$, made of rawhide or other suitable flexible material. These whippers revolve rapidly and whip, beat, or knock the broken wood and outside bark from the fiber. The broken stalks, as they leave the breaker on their way to the whippers, pass through or between the small rolls D D, which, while carrying said stalks along, also support or hold the broken stalks while being acted upon by the whippers.

The whippers G G are coupled to rotate in concert—as, for instance, by pulleys $k\ k$ on their shafts and a connecting-belt, $l$. These whippers are made to revolve alternately in reverse directions simultaneously—that is, first on their meeting sides of travel toward the rear end of the machine, and then or after a rear set of rollers, H H, either or both of which may be driven, have taken hold of the fiber or material, and just before the fiber is released from the rollers D D in a reverse direction. This reversal of the whippers may be effected by any suitable means—as, for instance, by using a straight-driving belt, $m$, and a cross-driving belt, $n$, in connection with two fast pulleys, $o\ o'$, and a loose pulley, $r$, upon the shaft of the one whipper, and a shifter, $s$, of said belts operated through a lever by the operator standing in front of the machine. Such reversing motion being a common one needs no further description.

To prevent the jute or fiber from falling when passing between the whippers or from one set of rolls, D D, to the next or rear set, H H, a carrier or supporter may be interposed between the whippers. This supporter should be an open one, preferably in the form of a movable net or reticulated apron, I, which may be made of strips of leather, $u$, said netting being arranged to pass between the whippers, inclosing the lower whipper, and supported upon suitably-arranged rollers, $v$. This apron may either be arranged to run upon four rollers, as shown by full lines in Fig. 1, or upon six rollers, as shown by full and dotted lines in the same figure.

A covering, J, is applied to the upper portion of the machine and down to near where the whippers meet, for the purpose of preventing pieces of broken stalks and other trash thrown outward by the whippers from falling back onto the fiber.

Having thus described my invention, what I claim as new, and desire to secure by Letters Patent, is—

1. In a machine for decorticating ramie, jute, and other fibrous plants, the combination, with the feed-rolls B B, of the slotted frame or box C and the reciprocating slotted double-acting breaker E, substantially as specified.

2. The combination, with the feed-rolls B B, the slotted frame or box C, and the reciprocating slotted double-acting breaker E, of the rolls D D in rear of said breaker, essentially as herein set forth.

3. In a machine for decorticating ramie, jute, and other fibrous plants, the combination of the revolving whippers G G, the rolls D D, the slotted frame or box C, and the reciprocating double-acting breaker E, substantially as specified.

4. In a machine for decorticating ramie, jute, and other fibrous plants, the combination, with the forward rolls, D D, and the rear rolls, H H, of the whippers G G, and a mechanism for revolving said whippers alternately in reverse directions simultaneously, substantially as specified.

5. The combination of the reticulated carrier or supporter I, the whippers G G, alternately revolving in reverse directions simultaneously, the rolls H H D D, the double-acting reciprocating breaker E, and the slotted frame or box C, essentially as and for the purposes herein set forth.

CHRISTIAN C. KAUFFMAN.

Witnesses:
GEO. E. SEARS,
O. ELMER.